Oct. 22, 1968 G. DOUCET 3,406,598
DEVICES FOR CIRCULARLY SECTIONING PLASTIC
OBJECTS, NOTABLY FOR TRIMMING BOTTLES
Filed Feb. 7, 1966 2 Sheets-Sheet 1
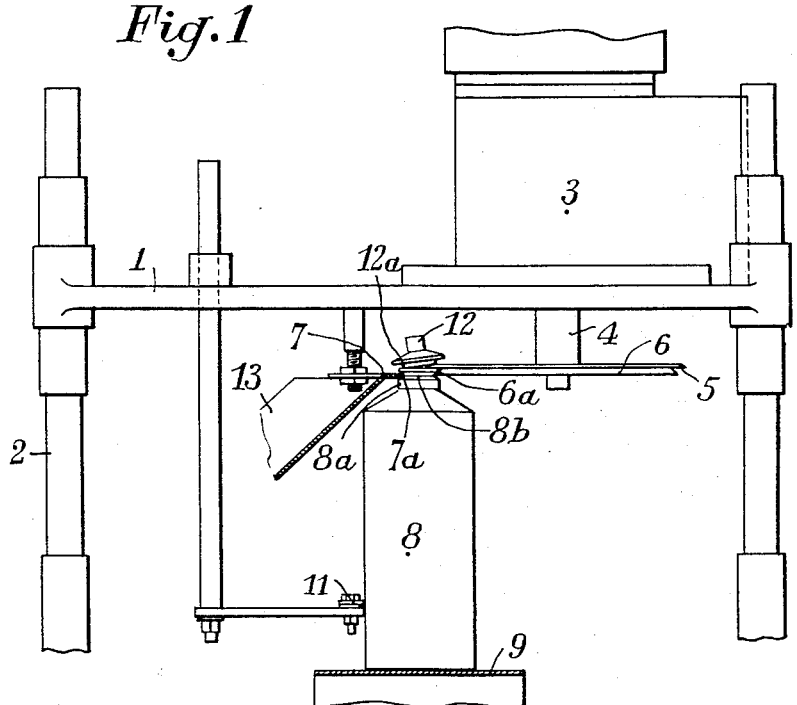
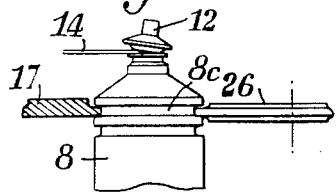
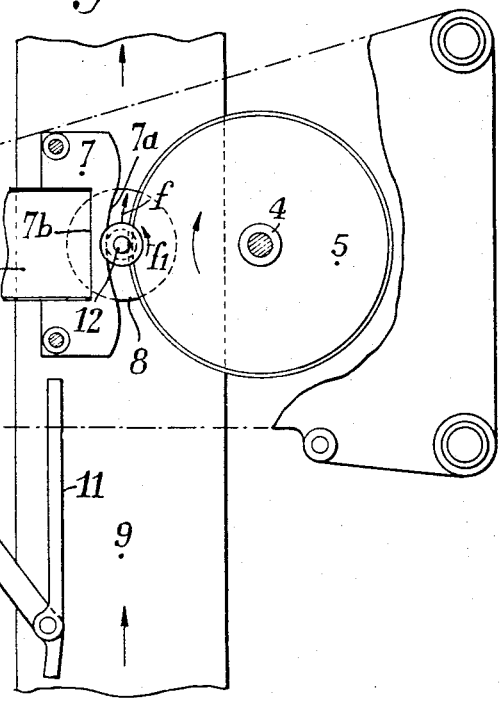
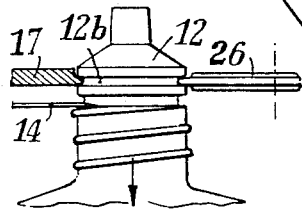

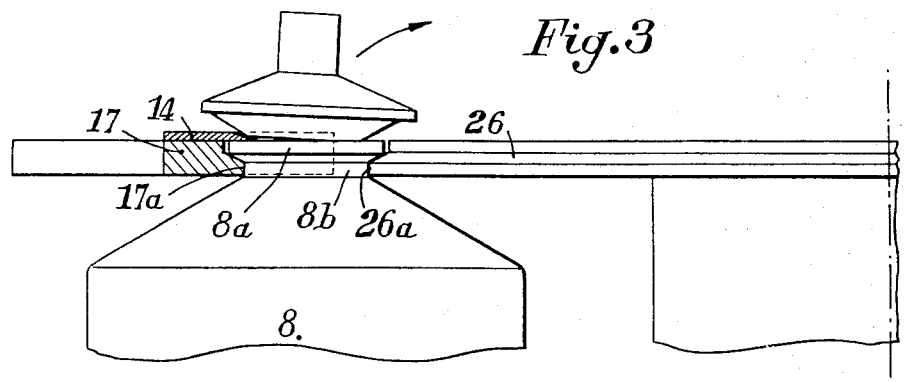
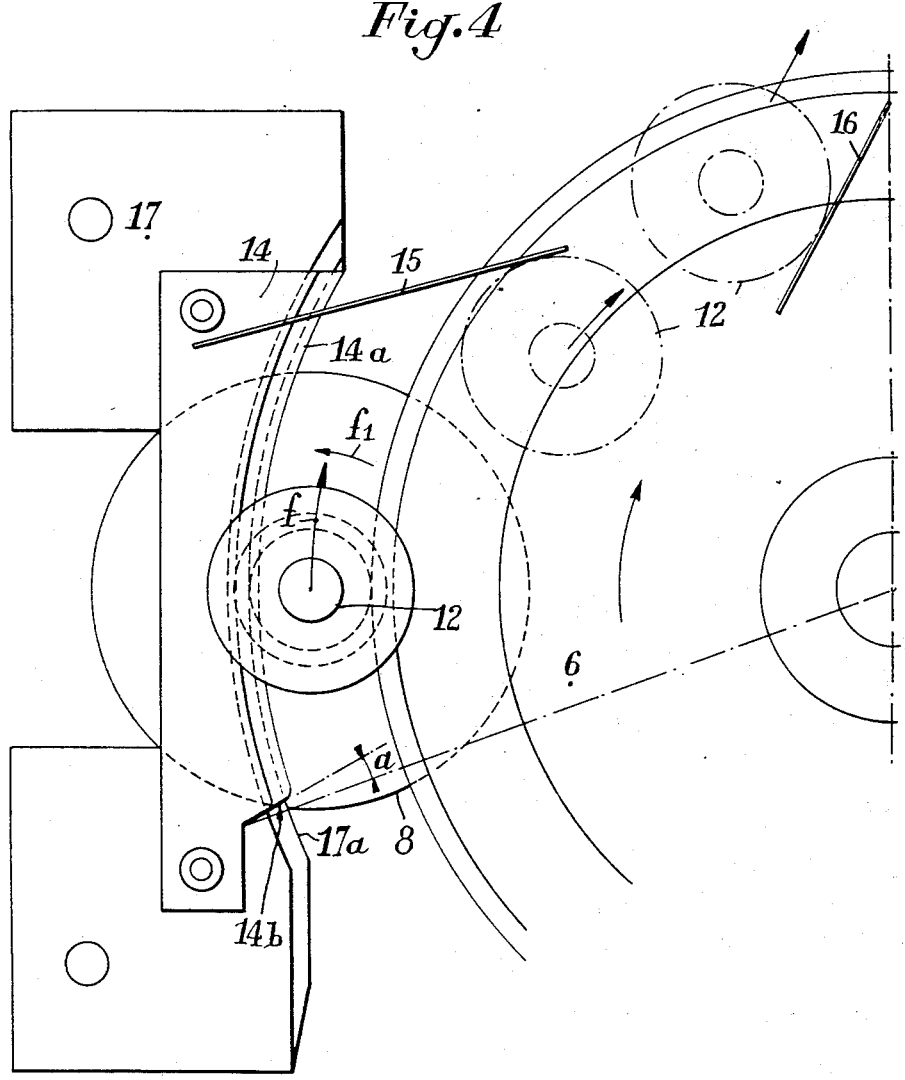

United States Patent Office 3,406,598
Patented Oct. 22, 1968

3,406,598
DEVICES FOR CIRCULARLY SECTIONING PLASTIC OBJECTS, NOTABLY FOR TRIMMING BOTTLES
Gilles Doucet, Saint-Jean-Vedas, France, assignor to Georges Lesieur & Ses Fils, Societe Anonyme, Paris, France, a French company
Filed Feb. 7, 1966, Ser. No. 525,567
Claims priority, application France, Feb. 9, 1965, 4,846
8 Claims. (Cl. 82—46)

ABSTRACT OF THE DISCLOSURE

Device for circularly cutting plastic objects having formed in their walls a circular groove adapted to constitute a supporting groove, notably for trimming bottles, which comprises a fixed guide member and a rotatably movable guide member, said circular groove being adapted to be inserted between said guide members, and a cutting blade penetrating into said object during its movement between said guide members.

---

This invention relates to a device for circularly cutting-off or sectioning plastic objects, notably for trimming bottles.

A machine for trimming plastic bottles is already known wherein the bottles molded on mandrels carried by a rotary plate move past a fixed blade interposed on the path of their necks for cutting off the neck plug.

A trimming machine of this type is objectionable in that it does not provide a clean cut in the case of bottles molded from scarcely rigid material and on the other hand the trimming device proper is an integral part of the molding machine.

This invention is concerned with a trimming device separate from the assembly machine, the device being thus adapted to be located in any desired position in a continuous production line for the manufacture of plastic objects.

This invention is concerned with a device for carrying out the method broadly disclosed hereinabove, this device being characterized in that it comprises two guide members, respectively a fixed member and a rotatably movable member, between which the circular groove of the object to be sectioned is inserted, and a cutting blade penetrating into the object during its translation between said two guide members.

The cutting blade may be either fixed or movable. In the case of a movable blade it consists of a cutting disc either rigid with a circular rotary guide member and therefore revolving at the same speed as this guide member, or independent and driven at any suitable speed from separate means.

In the case of a fixed cutting blade, its edge must be so shaped that the cutting operation takes place gradually as the object revolving about itself is pressed against said blade edge; it may be straight and moved across the path of the rotating object or have the shape of a circular arc, or any other shape capable of providing the desired effect.

The relative arrangement of said fixed cutting blade and said fixed and movable guide members depends of course on the desired position of the cutting line or plane in relation to the surface configuration of the object, notably at the level of the circular supporting groove which may lie just beneath the cutting line or plane or at any other suitable level along the wall of said object, or, if a grooveless shape is desired, in the plug overlying the cutting line or plane.

The trimming device according to this invention is advantageous in that it provides a clean cut, without burrs, when removing the neck plug of bottles molded from relatively soft or moderately rigid plastic material.

In order to afford a clearer understanding of this invention and of the manner in which the same may be carried out in practice, various forms of embodiment thereof will now be described with reference to the attached diagrammatic drawings, in which:

FIGURE 1 is an elevational view showing a plastic bottle trimming device utilizing a rotary cutting disc;

FIGURE 2 is a plan view from above with parts broken away, of the device illustrated in FIGURE 1;

FIGURE 3 is a fragmentary elevational view of a plastic bottle trimming device incorporating a fixed cutting blade;

FIGURE 4 is a diagrammatic plan view from above of the device illustrated in FIGURE 3;

FIGURES 5 and 6 are diagrammatic elevational views showing alternate forms of embodiment of the trimming device illustrated in FIGURE 3.

The device illustrated in FIGURES 1 and 2 of the drawings comprises essentially a horizontal frame structure 1 supported by three stationary vertical legs 2 and adjustable vertically by means of a screw-and-nut mounting. This frame structure 1 carries a motor and reduction gear assembly 3 having mounted on its vertical output shaft 4 on the one hand a disc 5 formed with a sharp cutting edge and on the other hand a movable circular guide member 6 underlying said cutting disc 5.

The frame structure 1 carries at the level of said movable guide member 6 a fixed guide member 7 comprising an edge 7a for example of arcuate concave contour somewhat concentric to the axis of rotation of said movable guide member 6.

The rigid or semi-rigid bottles 8 of plastic material (for example polyvinyl chloride, polyethylene, polycarbonate, or like plastic material) to be trimmed by the device are delivered by a conveyor 9 and so directed by input guide means 11 that the grooves 8b of the necks 8a of said bottles engage the gap left between said fixed and movable guide members 7 and 6.

As shown in FIGURE 1, the neck 8a of bottle 8 has a circular groove 8b formed therein which is engaged by the edge 7a of said fixed guide member 7 and also by the edge 6a of the rotary guide member 6. The device operates as follows: The bottles 8 still with their neck plugs 12 are fed by the conveyor 9 and the feed member 11 between the fixed guide member 7 and movable guide member 6. The inner groove 12a of plug 12 engages the edge of the cutting disc 5 as the groove 8b of neck 8a is engaged between the edge 7a of the fixed guide 7 and the edge 6a of the rotary guide member 6. The bottle is lifted very lightly from the conveyor 9 as the cutting disc 5 engages the circular groove 12a formed between the neck 8a of the bottle and the plug 12, the edge 6a of the movable guide member 6 engaging the groove 8b of neck 8a, the edge 7a of the fixed guide member 7 engaging the same groove but from the opposite side.

The bottle 8 thus lifted is carried along between the fixed and movable guide members 7 and 6 while rotating on the one hand about the axis of the cutting disc 5 and movable guide member 6 (as shown by the arrow $f$ in FIGURE 2), and on the other hand about its axis of revolution (see arrow $f_1$). As a consequence of this movement the plug 12 is cut off the neck 8a of the bottle, due to the adequate difference between the diameter of the cutting disc 5 and the diameter of the movable guide member 6. The thus sectioned plug 12 falls into a chute 13 through a rectangular notch 7b formed in the fixed guide member 7.

In the alternate form of embodiment of this invention which is illustrated in FIGURES 3 and 4, the movable guide member 26 consists, as in the preceding example, of a disc rotatably driven about its axis and having an edge 25a engageable in the groove 8b formed in the neck 8a of bottle 8. This groove 8b is also engaged by the edge 17a of the fixed guide member 17. This edge has an arcuate contour. On the other hand, the cutting blade 14 is fixed and carried by the fixed guide member 17. This cutting blade comprises an arcuate portion 14a and a rectilinear inlet portion 14b also formed with a sharp edge and set at an angle $a$ of 10° to 20° with respect to the straight line connecting the inner end of this inlet portion 14b to the axis of the rotary guide member 26. The arcuate portion 14a and inlet portion 14b are connected by a circular arc of reduced radius.

According to a modified form of embodiment, the cutting blade 14 may also have a rectilinear contour at least on part of its length.

In the above-described form of embodiment, the movements of rotation of the bottle 8 about the axis of the movable guide member 26 (in the direction of the arrow) and about its axis of revolution (arrow $f_1$) are only due to the rolling engagement of the edge 26a of movable guide member 26 in the groove 8b of neck 8a. The rotation of bottle 8 on the cutting blade 14 causes the plug 12 to be sectioned. In one form of embodiment, this plug is carried along by a first flush blade 15 mounted on the circular rotary guide member 6, of which the rotation causes the plug to be moved towards another fixed flush blade 16 directing the plug towards an external chute (not shown).

In the modified form of embodiment illustrated in FIGURE 5, the fixed guide member 17 and movable guide member 26 are caused to engage an annular guide groove 8c formed at any suitable level in the surface of the body of bottle 8. The fixed cutting blade 14 is thus held at a certain distance above the fixed guide member 7.

According to another modified form of embodiment illustrated in FIGURE 6, the fixed guide member 17 and the movable guide member 26 are caused to engage an annular guide groove 12b formed in the plug 12 of neck 8a. In this case the fixed cutting blade 14 is located beneath the fixed guide member 7 and somewhat spaced therefrom. Under these conditions the fixed circular guide member 7 must be extended sufficiently to transfer the thus sectioned plug 12 to a discharge chute.

The form of embodiment of the device illustrated in FIGURE 6 is convenient when no guide groove is formed in the neck 8a of bottle 8 (for example if the neck has a threaded portion).

In all the forms of embodiment described hereinabove, adjustment devices may be provided for causing the vertical displacement of the guide and cutting assembly in order properly to adjust the vertical position of this assembly above the conveyor 9, to permit the translation of the cutting blade 14 or 5 in its plane, to provide the adequate cutting depth, and finally to permit the translation of the fixed guide member 7 or 17 in its plane for clamping the groove 8b, 8c or 12b of the bottle neck between the fixed guide member 7 or 17 and the circular rotary guide member 6 or 26.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

What I claim is:

1. Device for circularly cutting plastic objects having formed in their walls a circular groove adapted to constitute a supporting groove, notably for trimming bottles, which comprises a fixed guide member and a rotatably movable guide member, said circular groove being adapted to be inserted between said guide members, and a cutting blade penetrating into said object during its movement between said guide members.

2. Device as set forth in claim 1, wherein said fixed and movable guide members are circular and concentric.

3. Device as set forth in claim 1, wherein said cutting blade consists of a disc having a cutting edge, said movable guide member consisting of a disc rigid with said cutting disc and driven for rotation about its axis.

4. Device as set forth in claim 1, wherein said cutting blade is stationary.

5. Device as set forth in claim 4, wherein said fixed cutting blade is mounted on a circular fixed guide member.

6. Device as set forth in claim 4, wherein said fixed cutting blade has a curved contour, notably a circular contour.

7. Device as set forth in claim 4, wherein the edge of said cutting blade has a shape at least partially rectilinear.

8. Device as set forth in claim 4, wherein said movable guide member is circular and rotatably driven about an axis, said fixed cutting blade having on its side engaged by the objects to be cut, a rectilinear edge forming an acute angle of low amplitude with a straight line connecting the inner end of said edge to the axis of rotation of said circular movable guide member and a circular edge connected to said rectilinear edge of said blade.

References Cited

UNITED STATES PATENTS

| 1,807,671 | 6/1931 | Phelps | 82—101 X |
| 1,934,660 | 11/1933 | Fairchild | 82—101 |
| 2,114,272 | 4/1938 | Temple | 82—101 |
| 2,298,366 | 10/1942 | Gladfelter | 82—85 |
| 3,084,578 | 4/1963 | Hartford | 82—101 X |
| 3,129,621 | 4/1961 | Makowski | 82—59 |

HARRISON L. HINSON, *Primary Examiner.*